April 28, 1970   J. L. DE CLERK ET AL   3,509,337

TEST OBJECT AND CASSETTE FOR TOMOGRAPHY

Filed Nov. 30, 1967

INVENTORS
JOSEPH L. DeCLERK
HARRY S. HARVEY, Jr.
LLOYD S. LANDA &
JAMES E. RYKEL

BY  *Harvey S. Boyd*

ATTORNEY

United States Patent Office 3,509,337
Patented Apr. 28, 1970

3,509,337
TEST OBJECT AND CASSETTE FOR TOMOGRAPHY
Joseph L. De Clerk, Red Bank, and Harry S. Harvey, Jr., Fort Lee, N.J., Lloyd S. Landa, Mamaroneck, N.Y., and James E. Rykel, Longbranch, N.J., assignors to the United States of America as represented by the Secretary of the Army
Filed Nov. 30, 1967, Ser. No. 686,889
Int. Cl. G03b 41/16
U.S. Cl. 250—61.5                               2 Claims

ABSTRACT OF THE DISCLOSURE

This invention relates to improvements for greater precision in the art of simultaneous multisection radiography. It has been discovered that by utilizing a book cassette having solid separation sheets of precision flatness and a phantom test object having precision machined lead numbers adjustable to the level desired, the Polytome is capable of producing body section radiographs of superior overall parallelism from film plane to film plane.

The invention described herein may be manufactured and used by or for the Government for governmental purposes without the payment to us of any royalty thereon.

BACKGROUND OF THE INVENTION

Field of the invention

This invention is designed to improve the accuracy of simultaneous, multisection tomography, for example to give an improved picture of the cross-sectional area of the vocal tract. Using present equipment an error of ±3 millimeters (mm.) is to be expected in the adjustment of the object plane location. However, by eliminating uneven film separation in the film plane and accurately identifying the object plane an accuracy of ±0.5 mm. in the object plane location for simultaneous polytomography is achieved.

Description of the prior art

Recent attempts at analyzing tomographic films with multisection book cassettes have proven unsatisfactory. Analysis was unsatisfactory for the following reasons.

The section interval or selectivity was usually greater than the separation between the films causing the overlapping of structures present on adjacent films.

The object planes could not be located with precision when using a multisection book cassette.

Due to the compressibility of the material used for separating the film planes the image planes were at different locations depending on how the book cassette was loaded in the cassette holder.

Littleton in Polydirectional Body Section Radiography, a refresher course published by the American Roentgen Ray Society, October 1963, stated that the direction of the tube-film movement in any tomographic system is reflected in its blur pattern. A uniform obscuring results from circular movements, but by the use of hypocycloid movement the greatest and most irregular blur with the lowest potential to present residual blur or false shadows is provided.

However, in Medicamundi, vol. 10, No. 1, pp. 10–20 (1964) Littleton related that of the numerous techniques used to measure the thickness of the layer under examination the suggested method utilizes a wire helically wound around a plastic core as a test object. With such a test object the selectivity theoretically could be evaluated if the pitch of the coil and diameter of the wire were known through the position of those turns in focus. In actual practice with such a system it is extremely difficult, if not impossible, to fix the end points of the focal plane.

SUMMARY

A new improved test object was designed having individually adjustable lead numbers. The lead numbers were 0.5 mm. thick and spaced 5 mm. apart with an individual adjustment ability of 20 mm. through the use of a precision screw. The test object is adapted to be used with a multiscreen cassette having a uniform film spacing of 5 mm.

Accordingly, it is an object of this invention to provide individually adjustable lead numbers in a test object for use in a multisectional tomographic system.

It is another object to provide an accurate method of determining the selectivity of a Polytome radiograph.

It is a further object to provide an improvement in conventional Polytome radiography whereby the radiologist may obtain a number of different planes at the same point in time, reducing patient dosage, with an improved book cassette.

BRIEF DESCRIPTION OF THE DRAWINGS

These and other objects will become apparent with reference to the following discussion and drawings wherein.

DESCRIPTION OF THE PREFERRED EMBODIMENT

Figure 1:
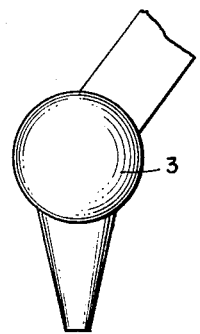
FIG. 1 is a schematic of the tomographic system.

In the conventional tomographic machine of FIG. 1 the test object, 1, is positioned on the table, 2, between the source, 3, and film plane, 4, or cassette.

Body section radiography has progressed to a point where a plane of focus of 1½ mm. in depth can be sharply relieved on the radiograph using a single cassette at the film plane, and distinct structural changes discerned at only a ½ mm. variance above or below the preselected plane. For example, a lead number 5 of 1 mm. in thickness wil be hypercritically sharp at a hypothetical setting of d mm. above the table top, and a setting of d+0.5 mm. will show a slight shadow or penumbra around the lead numbers.

A film taken with ultra-amplitude traverses, hypocycloidal or large circle maneuvers, reveals an image which lacks the customarily accepted blurring or smearing to such an extent that to the inexperienced eye the image would appear to be a conventional, multistructure, superimposition radiograph.

Simultaneous polytomography offers the radiologist the advantages of obtaining a number of different planes at the same time, reducing patient dosage, and shortening the examination.

Figure 4:
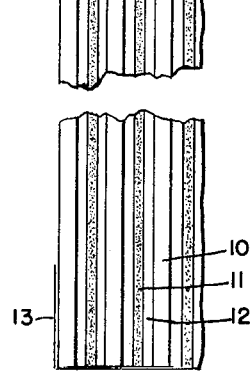
FIG. 4 shows a multisection book cassette.

The conventional book cassette uses a foam spacer between each film plane and its intensifier screens. Aging, desiccation, and varying atmospheric environment affect the compressibility of the foam. Therefore, to insure precise film plane to glm plane parallelism the foam spacers are replaced with rigid, radiolucent plastic spacers as shown in FIG. 4. Each film plane is disposed exactly 5 mm. from adjacent planes through use of the rigid plastic spacers 10, between the film 11, and intensifier screens 12. The book cassette of FIG. 4 will achieve the duplication of 3 mm. parallel planes of focus and variances ½ mm. above or below these planes. For convenience the cassette of FIG. 4 may be bound with tape 13.

Figure 3:
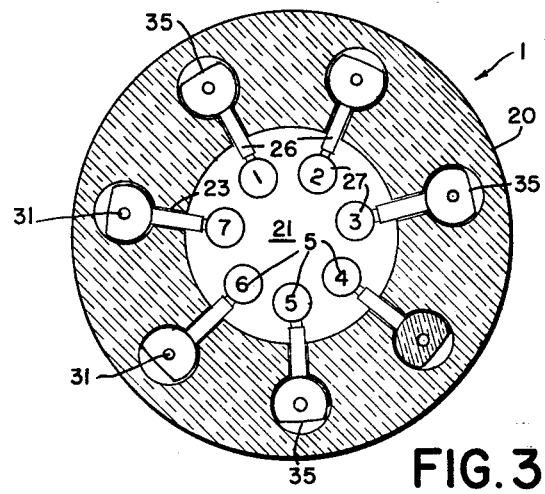
FIG. 3 is a top view of the test object of FIG. 2 along line 3—3.
Figure 2:
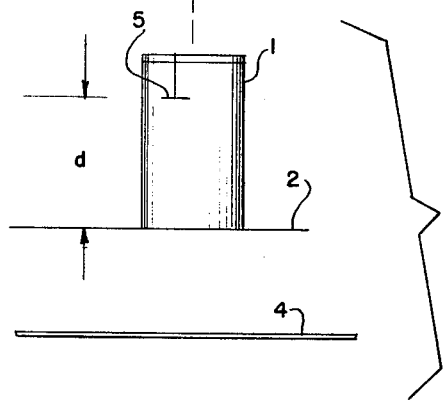
FIG. 2 is a side view of the test object of this invention.
Figure 2:
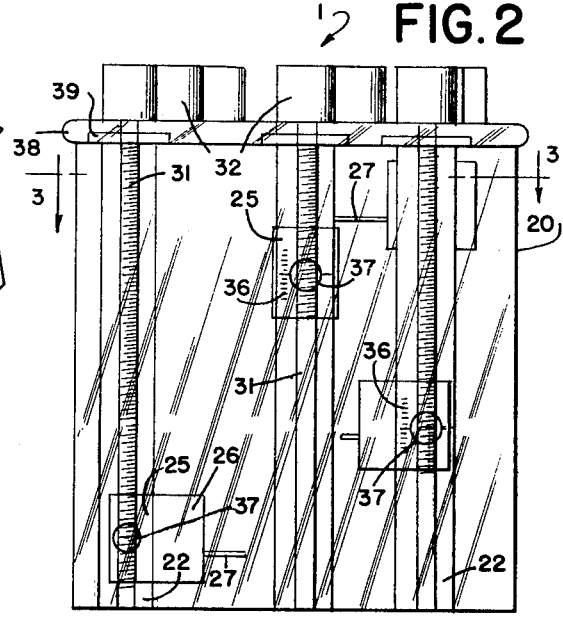

The test object 1 of this invention, as shown in FIGS. 2 and 3 comprises a cylinder, 20, having a longitudinal coaxial passage 21 and a preselected number of peripheral bores 22, disposed equidistantly around the central passage 21. A radial key slot 23 is disposed on the radius between the axis of the central passage 21 and the axis of each peripheral bore 22.

Pistons 25 are slidably received in each bore 22, and each piston carries a key 26. Keys 26 rides in slots 23, and in turn carry platforms 27, supporting lead numbers 5.

Each piston 25 moves through its bore 22, responsive to a coaxial, threadly mounted screw 31, secured externally to the cylinder 20, by knobs 32.

Accordingly, rotation of knob 32 causes piston 25 to move vertically through bore 22. Edge 35, of piston 25, is flattened and carries a reading scale 36 zeroed to correspond with numbers 28. Holes 37 and reading mark 38, on the walls of cylinder 20, cooperate with scale 36 to provide a precision measure of the elevation of number 5 with relation to the cylinder base 37.

Cylinder top 38 is removably secured to cylinder 20 and encloses washer 39, a bearing surface for knob 32.

Test object 1 may be constructed from radiolucent plastic with the exception of the screw 31 and numbers 5. The numbers are designed to be ½ mm. thick with holes 37 spaced at 5 mm. vertical intervals to correspond to the 5 mm. distance between film planes 11, in the book cassette of FIG. 4. Piston scale 36 may be adjustable over 20 mm.

A calibration experiment was performed to determine where the numbers 28 must be set on the test object 1 to register correctly on the multisecreen cassette of FIG. 4. This would in turn give the exact location of the object plane inside a subject or patient. The Massiot Polytome using hypocycloidal motion and techique factors of 60 kilovolts, 6 seconds, and 15 milliamps were used. Perfect focus for the seven film planes was obtained when the adjustable lead numbers were positioned as follows:

| Separation for lead numbers: | Millimeters |
|---|---|
| 1 and 2 | 3.0 |
| 2 and 3 | 4.5 |
| 3 and 4 | 4.0 |
| 4 and 5 | 3.0 |
| 5 and 6 | 4.5 |
| 6 and 7 | 2.5 |

The section interval or selectivity of each plane when using the multiscreen cassette is 3 mm.

It will be obvious to one skilled in the art that the dimensions may be varied as may the number of bores in the test object and sheets in the cassette within the scope of this invention.

A more complete history is reported in our article published by the American Association of Physicians in Medicine on Dec. 2, 1966.

We claim:
1. In a system for simultaneous multi-section tomography having an X-ray source, a subject support, an object plane, and an image plane, the improvement comprising the combination of:
   (a) a multiple film book cassette disposed at the image plane, said cassette including substantially parallel, solid, X-ray transparent spacer sheets, a plurality of film sheets disposed in alternating layers with said spacer sheets, and a plurality of X-ray intensifying screens, one of said intensifying screens being disposed on each side of each of said film sheets; and
   (b) a test object disposed at the object plane, said test object including a plurality of independently vertically adjustable lead wafer identification numbers, said test object being disposed on the support between the source and the image plane, and each number disposed at a preselected vertical distance from each other and from a reference point so that the presence of an individual number in sharp focus in a developed X-ray picture indicates the plane of focus for said picture.

2. A test object for use in X-ray tomography comprising:
   (a) a cylindrical housing of X-ray transparent material with a portion of said housing bordering a longitudinal passage through said housing coaxial with the cylindrical housing axis;
   (b) a plurality of vertically adjustable lead numbers slidably mounted within said housing and radially disposed about said cylindrical housing axis and extending into said longitudinal passage;
   (c) measuring means carried by said housing on an external wall thereof for measuring the height of each lead number above a reference point common to all numbers in said housing; and
   (d) means mounted in said housing for vertically adjusting the position of each of said numbers.

References Cited
UNITED STATES PATENTS

| 2,790,084 | 4/1957 | O'Dell et al. | 250—59 |
| 3,178,574 | 4/1965 | Stryker | 250—59 |
| 3,291,983 | 12/1966 | Landau | 250—61.5 |

WILLIAM F. LINDQUIST, Primary Examiner

U.S. Cl. X.R.

250—59